UNITED STATES PATENT OFFICE.

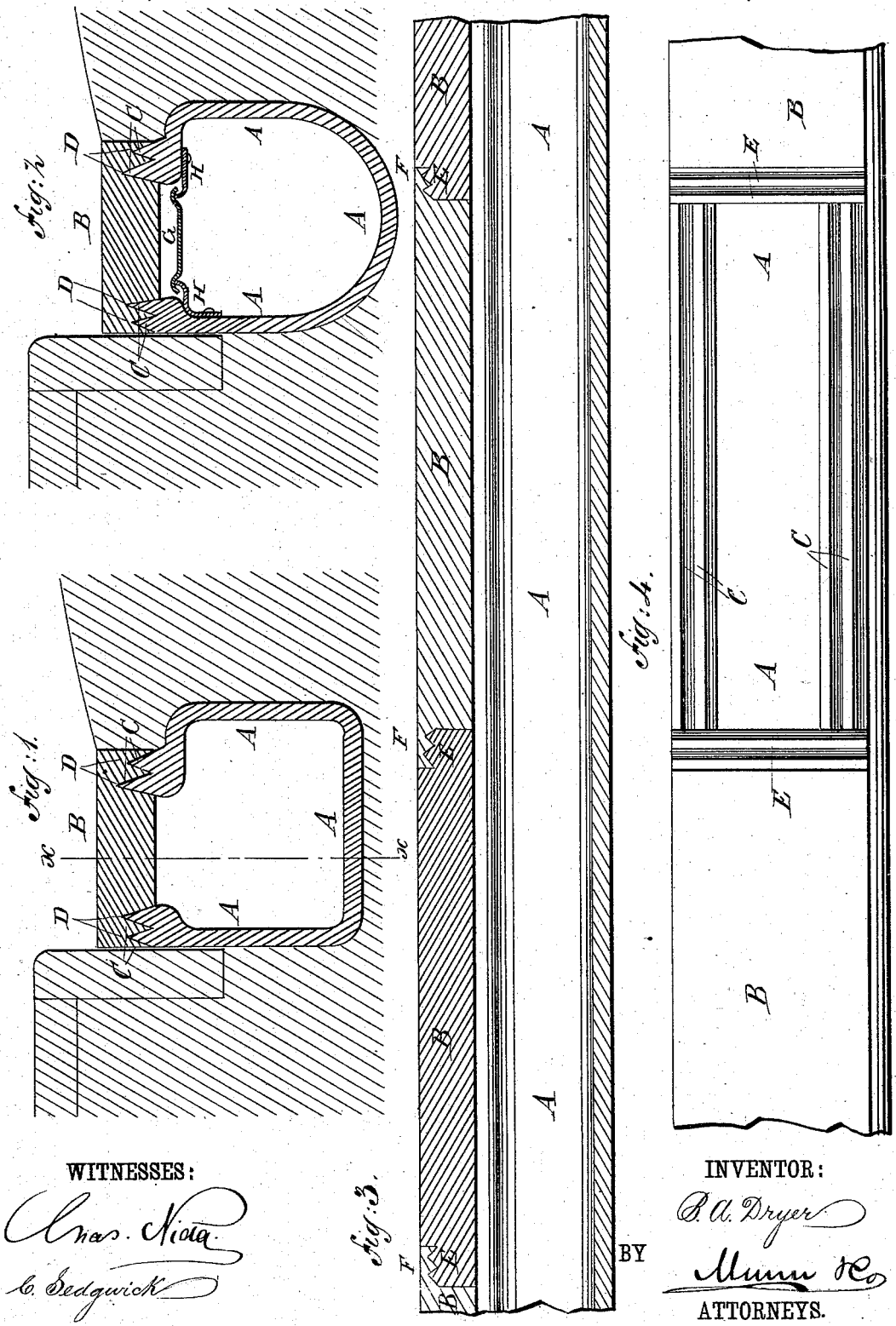

BERNHARD A. DRYER, OF NEW YORK, N. Y.

CONDUIT FOR ELECTRIC WIRES.

SPECIFICATION forming part of Letters Patent No. 288,555, dated November 13, 1883.

Application filed May 26, 1883. (No model.)

To all whom it may concern:

Be it known that I, BERNHARD ABRAHAM DRYER, of the city, county, and State of New York, have invented a new and useful Improvement in Conduits for Electric Wires, of which the following is a full, clear, and exact description.

Reference is to be had to the accompanying drawings, forming a part of this specification, in which similar letters of reference indicate corresponding parts in all the figures.

Figure 1 is a sectional end elevation of my improvement. Fig. 2 is the same section as Fig. 1, but showing a modification. Fig. 3 is a sectional side elevation of the same, taken through the line $x\,x$, Fig. 1. Fig. 4 is a plan view of a portion of the same, a section of the cover being removed.

The object of this invention is to provide conduits for electric wires constructed in such a manner as to fully protect the wires, while giving convenient access to the interior of the said conduits for the purpose of inserting and repairing the said wires. In the conduit-box, at the sides of its top opening, are formed hooked flanges, upon which rest the hooked edges of a pan to receive the water of condensation formed upon the under side of the conduit-cover, as will be hereinafter fully described.

A represents an iron box, of any desired size and shape, which is made with a top opening of sufficient width to allow the wires to be conveniently put in and repaired. One side of the box A is vertical, and the upper part of the other side is bent inward and then upward to bring the upper edges of the two sides to the same level to receive and support the cover B, which is also of iron, and of sufficient thickness to sustain any pressure that may come upon it. The edges C of the box A are beveled upon their outer and inner sides, and have each a deep angular groove formed in them, as shown in Figs. 1 and 2. In the side parts of the under surface of the cover B are formed two angular grooves, D, to receive and fit upon the angular edges C of the box A, the said grooves D being made in such positions that the edge of the cover B, at the vertical side of the box A, will be flush with the said side, as shown in Figs. 1 and 2. The cover B is made in sections of convenient length, and the ends of the said sections are rabbeted, so that the said ends can be overlapped, while leaving the upper surfaces of the adjacent sections flush with each other. The rabbets E of every other section of the cover B are formed upon the upper side, and the rabbets F of the other sections are formed upon the lower side, as shown in Figs. 3 and 4, so that any desired part of the cover B can be readily removed. The shoulders of the rabbets E F have each two angular cross-grooves formed in them, so that the rabbeted ends of the cover-sections will interlock with each other, as shown in Fig. 3. By jointing the cover and box in this way, the water, after passing over the first or lowest projection, C, cannot pass over the higher or inner one.

If desired, shallow pans G can be placed in the top opening of the box A, to receive any water of condensation that may form upon the lower side of the cover B. The side edges of the pan G are bent over into hook form, to receive the hooked edges of the flanges H, formed upon the box A at the opposite sides of its top opening, as shown in Fig. 2.

The conduit is designed to be placed in the street with its vertical side against the curbstone, as shown in Figs. 1 and 2, the cover B forming the gutter; or the conduit can be placed beneath the outer part of the sidewalk, the vertical side of the conduit forming the curbstone, and the cover B forming the outer part of the said sidewalk. At street corners, where a part of the wires are to turn the corner and a part are to cross the street, a section of the box A is made with three arms, so formed as to correspond with the angle of intersection of the streets. In this case the cover of the said three-armed sections may be cast with it, or may be cast separate and connected with it in the manner hereinbefore described with reference to the straight parts of the conduit.

In some cases the body of the conduit can be made of brick-work, with iron bars or plates laid in the tops of its side walls, and having angular edges C formed upon them, to interlock with the angular grooves D of the cover B.

Having thus fully described my invention, I claim as new and desire to secure by Letters Patent—

1. The combination, with an electric-wire-conduit box, A B, of the pan G, concaved around its periphery, and the upwardly end-curved flanges H, arranged to form a bearing for the pan, as shown and described.

2. The conduit A, having the upwardly-projecting angular edges C C, the inner one higher than the outer one, in combination with a cover, B provided with corresponding grooves to receive said projections, whereby the water, after passing over the first or lowest projection, cannot pass over the other, as described.

BERNHARD A. DRYER.

Witnesses:
JAMES T. GRAHAM,
EDGAR TATE.